United States Patent
Teranishi et al.

(10) Patent No.: US 6,376,127 B1
(45) Date of Patent: Apr. 23, 2002

(54) RECHARGEABLE LITHIUM BATTERY CONTAINING A COMPLEX SULFIDE ACTIVE MATERIAL

(75) Inventors: Tadashi Teranishi, Sumoto; Hiroshi Nakajima, Hirakata; Hiroshi Watanabe, Sumoto; Shin Fujitani, Hirakata, all of (JP)

(73) Assignee: Sanyo Electric Co., LTD, Moriguchi (JP)

( * ) Notice: Subject to any disclaimer, the term of this patent is extended or adjusted under 35 U.S.C. 154(b) by 0 days.

(21) Appl. No.: 09/535,956

(22) Filed: Mar. 27, 2000

(30) Foreign Application Priority Data

Mar. 25, 1999 (JP) ............................................. 11-081230

(51) Int. Cl.$^7$ .............................................. H01M 4/58
(52) U.S. Cl. ............................ 429/231.1; 429/231.95; 429/231.5; 429/231.3; 429/223; 429/224; 429/220; 429/229
(58) Field of Search ..................... 429/231.1, 231.95, 429/231.5, 231.3, 224, 223, 229, 220

(56) References Cited

U.S. PATENT DOCUMENTS

| | | |
|---|---|---|
| 4,007,055 A | 2/1977 | Whittingham |
| 4,136,233 A * | 1/1979 | Eisenberg ................... 429/112 |
| 4,456,520 A | 6/1984 | Phillips et al. |

FOREIGN PATENT DOCUMENTS

| | | | |
|---|---|---|---|
| JP | 60012677 | * 1/1985 | .......... H01M/10/36 |
| JP | 60 175371 | 9/1985 | |
| JP | 08 115745 | 5/1996 | |

OTHER PUBLICATIONS

James et al., "Defect thiospinels: A new class of reversible cathode material," 1989, J. Power Sources, 26, pp. 277–283.*
Imanishi et al., "Thiospinels as cathode for lithium secondary battery," 1993, J. Power Sources, 43–44, pp. 619–625.*
"LiB (CH$_3$)$_4$–Dioxolane Electrolyte in Rechargeable Li/TiS–Cells$_2$", by Lawrence P. Klemann et al.; Thermoelectric Power, vol. 128, No. 1, pp. 13–18, J. Electrochem. Soc.: Electrochemical Science and Technology, Jan., 1981.
"Binary Alloy Phase Diagrams", Ed.: T. B. Massalski, 1983; vol. 1, American Society for Metals, Metals Park, Ohio; pp. 795, 797, 858, 859, 955, 956.
"Why transition metal (di)oxides are the most attractive materials for batteries", by Ohzuku et al.; Solid State Ionics 69, (1994), pp. 201–211.
"Binary Alloy Phase Diagrams", Ed.: T.B. Massalski, 1986; vol. 2, American Society for Metals, Metals Park, Ohio; pp. 1497–1500, 1584, 1585, 1749, 1750, 2006, 2007.

* cited by examiner

Primary Examiner—Carol Chaney
Assistant Examiner—Angela J. Martin
(74) Attorney, Agent, or Firm—W. F. Fasse; W. G. Fasse

(57) ABSTRACT

A rechargeable lithium battery is disclosed having a positive electrode, a negative electrode and a non-aqueous electrolyte. Characteristically, the positive or negative electrode contains, as its active material, a complex sulfide represented by the compositional formula $M_x Ti_{1-x} S_y$, either with or without addition of Li thereto, wherein M is at least one selected from Cu, Zn, Cr, Mn, Co and Ni, x satisfies the relationship $0 < x \leq 0.18$ and y satisfies the relationship $1.65 \leq y \leq 2.25$.

9 Claims, 3 Drawing Sheets

RECHARGEABLE LITHIUM BATTERY CONTAINING A COMPLEX SULFIDE ACTIVE MATERIAL

BACKGROUND OF THE INVENTION

1. Field of the Invention

The present invention relates to a rechargeable lithium battery, and more particularly to a rechargeable lithium battery which utilizes the improved active material for its positive or negative electrode.

2. Description of Related Art

In recent years, rechargeable lithium batteries have been extensively developed. The performance characteristics of rechargeable batteries, such as charge-discharge voltages, charge-discharge cycle life characteristics and storage capabilities, depend largely on the particular electrode active material used. For example, the use of sulfide-based positive active material, such as $TiS_2$, is known to result in the reduction of battery voltages. This is attributed to the presence therein of free sulfur which reacts with a negative electrode. In order to overcome this deficiency, Japanese Patent Laid Open No. Sho 60-175371 (1985) proposes a method whereby a metal powder showing a tendency to readily react with sulfur, such as a copper powder, is added to the positive electrode.

However, the use of $TiS_2$ for the positive active material has imposed a problem of resulting in insufficient charge-discharge cycle characteristics (See, for example, Lawrence P. Klemann, J. Electrochem. Soc., Vol.128, No.1, 1981, pp. 13–18).

SUMMARY OF THE INVENTION

The present invention is directed toward solving the above-described problems and its object is to provide a rechargeable lithium battery which exhibits improved charge-discharge cycle characteristics.

The rechargeable lithium battery of the present invention has a positive electrode, a negative electrode and a non-aqueous electrolyte. Characteristically, the positive or negative electrode contains, as its active material, a complex sulfide represented by the compositional formula $M_xTi_{1-x}S_y$, wherein M is selected from at least one of Cu, Zn, Cr, Mn, Co and Ni, x satisfies the relationship $0<x\leq0.18$, and y satisfies the relationship $1.65\leq y\leq2.25$. The complex sulfide may further contain lithium.

In accordance with the present invention, the inclusion of the metallic element M (at least one of Cu, Zn, Cr, Mn, Co and Ni) in the crystal lattice of titanium complex oxide results in stabilizing the crystal structure of the active material. The use of titanium complex oxide for the active material of the positive or negative electrode thus leads to the improved charge-discharge cycle characteristics of resulting rechargeable lithium batteries.

Any of the above-listed metallic elements M for use in the present invention is known to form a stable compound with sulfur (S) and have a decomposition temperature of not below 1,000° C. (See, for example, binary phase diagrams for M-S in "Binary Alloy Phase Diagrams", American Society for Metals, 1986). Since any of these metallic elements M tends to be chemically bound to sulfur by a relatively strong force, such a metallic element M is believed to occupy certain sites in a crystal lattice of the $TiS_2$ phase and thus stabilize its crystal structure. Accordingly, other elements which also form compounds with sulfur, e.g., Cd, In, La, Ce, Sm, W and Pt, when introduced into titanium complex oxides to form solid solutions, are expected to be also effective in improving charge-discharge cycle life performance characteristics.

In the present invention, the stoichiometry x of the metallic element M in the above-specified complex sulfide composition is maintained not to exceed 0.18. If the inclusion of the metallic element M is excessive, i.e., if x exceeds 0.18, a simple substance or sulfide phase composed principally of M may be deposited to result in lowering the improving effect of charge-discharge characteristics.

In the present invention, the aforementioned complex sulfide for use as the positive or negative active material has a layered crystal structure similar to that of $TiS_2$. The presence of such a crystal structure can be identified by X-ray diffraction (XRD).

An electrolyte solvent for use in the rechargeable lithium battery according to the present invention can be selected from non-aqueous electrolyte solvents generally employed for rechargeable lithium batteries. Specifically, it may be a mixed solvent of cyclic carbonate and chain carbonate, for example. Examples of cyclic carbonates include ethylene carbonate, propylene carbonate and butylene carbonate. Examples of chain carbonates include dimethyl carbonate, methyl ethyl carbonate and diethyl carbonate. The electrolyte solvent may alternatively be a mixed solvent of the aforestated cyclic carbonate and an ether solvent, for example. Examples of ether solvents include 1,2-dimethoxyethane, 1,2-diethoxyethane and the like. Examples of useful electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)$ $(C_4F_9SO_2)$ $LiC(C_2F_5SO_2)_3$ and any combination thereof, for example. Other applicable electrolytes include gelled polymer electrolytes wherein a liquid electrolyte is impregnated in polymers such as polyethylene oxide and polyacrylonitrile, and inorganic solid electrolytes such as LiI and $Li_3N$, for example.

In the present invention, any non-aqueous electrolyte can be used, so long as it contains an Li compound as a solute for realizing an ionic conductivity, and a solvent used to dissolve and hold the solute is hardly decomposed at voltages during battery charge, discharge and storage.

In the case where the aforementioned titanium complex sulfide is used for the positive active material, a suitable negative active material may be chosen from carbon materials capable of electrochemical storage and release of Li, such as graphite (either natural or synthetic), coke, and calcined organics; Li alloys such as Li—Al, Li—Mg, Li—In, Li—Al—Mn alloys; and metallic Li. In such instances, a charge voltage of about 2.8 V and a discharge voltage of about 1.8 V will be given. The contemplated effect of improving cycle life performances becomes more significant when the carbon materials, among those active materials, are used for the negative active material. This is because the carbon materials are contrary in property to the Li alloys and metallic Li which, during charge and discharge, are likely to be accompanied by the growth of needlelike dendrites that could cause internal short circuits, and because the occurrence of sulfur slightly dissolved in the electrolyte solution to react with metallic Li or Li in any Li alloy at the negative electrode can be avoided, which otherwise results in the deposition on the negative electrode surface of a compound, such as $Li_2S$ (See, for example, binary phase diagrams for Li—S in "Binary Alloy Phase Diagrams", American Society for Metals, Vol.2, (1986), p.1500) that could deactivate the negative electrode.

In the case where the aforementioned titanium complex sulfide is used as the negative active material, a lithium-containing transition metal oxide, such as $LiCoO_2$, $LiNiO_2$, $LiMn_2O_4$, $LiMnO_2$, lithium-containing $MnO_2$, $LiCo_{0.5}Ni_{0.5}O_2$, $LiNi_{0.7}Co_{0.2}Mn_{0.1}O_2$, $LiCo_{0.9}Ti_{0.1}O_2$, $LiCo_{0.5}Ni_{0.4}Zr_{0.1}O_2$ or the like, can be used as the positive active material. In such instances, a charge voltage of about 2.3 V and a discharge voltage of about 1.3 V will be given. Those batteries are generally assembled in a discharged state and can be brought to a dischargeable condition by first charging them, i.e., by allowing Li present in the positive active material to migrate into the negative active material. The use of titanium complex sulfide as the negative active material thus results in a marked improvement of charge-discharge cycle life characteristics. This is considered due to the reduced charge voltage whereby the reductive decomposition of the electrolyte is suppressed.

DESCRIPTION OF PREFERRED EXAMPLES

Figure 1:
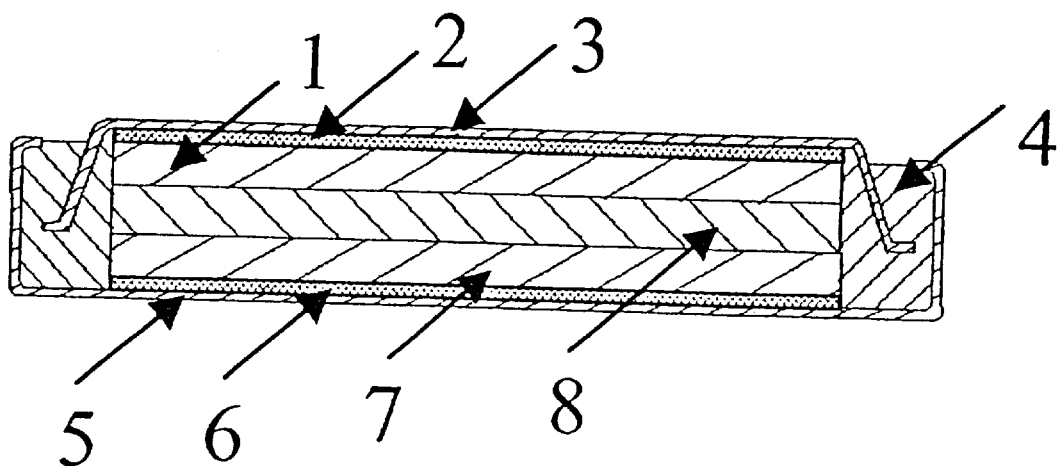
FIG. 1 is a sectional view, showing a construction of a coin type rechargeable lithium battery embodiment in accordance with the present invention.

The present invention is now described in more detail with reference to preferred examples. It will be recognized that the following examples merely illustrate the practice of the present invention but are not intended to be limiting thereof. Suitable changes and modifications can be effected without departing from the scope of the present invention.

EXAMPLE 1

Coin type batteries were assembled utilizing natural graphite active material for a negative electrode, and the active material of the present invention, i.e., the complex sulfide of the formula $M_{0.1}Ti_{0.9}S_2$ (M is Cu, Zn, Cr, Mn, Co or Ni) for a positive electrode. Each battery was measured for charge-discharge cycle life. In Example 1, the type of the metallic element M introduced was altered to investigate its effect on the charge-discharge cycle life.

(A) Positive Electrode Preparation 99.9% pure Cu, Ti and S reagents, as starting materials, were respectively weighed such that a ratio of numbers of Cu, Ti and S atoms was brought to 0.1:0.9:2, and then mixed in a mortar. The mixture was pressed in a 17 mm-diameter mold at a pressure of 115 kg/cm$^2$ into a shape, and then calcined under argon gas atmosphere at 300° C. for 36 hours and further at 600° C. for 48 hours to obtain a calcined product of the compositional formula $Cu_{0.1}Ti_{0.9}S_2$. This calcined product was subsequently crushed in a mortar into particles with an average particle size of 10 μm.

85 parts by weight of the $Cu_{0.1}Ti_{0.9}S_2$ powder, 10 parts by weight of carbon powder as an electrical conductor, and 5 parts by weight of polyvinylidenefluoride powder as a binder were mixed. By adding this mixture to an N-methyl-2-pyrrolidone (NMP) solution, a slurry was formed.

The slurry was applied by a doctor blade technique onto one surface of a 20 μm thick aluminum current collector to form an active material layer thereon. The current collector carrying the active material layer thereon was dried at 150° C. and then punched to remove therefrom a disc-form positive electrode having a diameter of 10 mm and a thickness of about 100 μm.

(B) Li Insertion Into Positive Electrode $LiPF_6$ was dissolved in a mixed solvent consisting of equivolume of ethylene carbonate and diethyl carbonate to a concentration of 1 mole/l to obtain an electrolyte solution. The above-prepared positive electrode, metallic Li and a microporous polypropylene membrane placed therebetween were immersed in the electrolyte solution, and then subjected to electrolysis at a constant current of 100 μA to 1.5 V versus Li/Li$^+$, so that Li was inserted into the positive electrode. This Li-inserted positive electrode was used in the below-described battery assembly (E).

(C) Negative Electrode Preparation 95 parts by weight of natural graphite powder and 5 parts by weight of polyvinylidenefluoride powder were mixed. A slurry was formed by adding this mixture to an NMP solution. This slurry was applied by a doctor blade technique onto one surface of a 20 μm thick copper current collector to form an active material layer thereon. The current collector carrying the active material layer thereon was dried at 150° C. and then punched to remove therefrom a disc-form negative electrode having a diameter of 10 mm and a thickness of about 60 μm. The negative electrode thus prepared was used in the below-described battery assembly (E).

(D) Electrolyte Preparation $LiPF_6$ was dissolved in a mixed solvent consisting of equivolume of ethylene carbonate and diethyl carbonate to a concentration of 1 mole/l to obtain an electrolyte solution. This electrolyte solution was used in the subsequent battery assembly (E).

(E) Battery Assembly

By utilizing the positive electrode, negative electrode and electrolyte solution respectively prepared in (B), (C) and (D), a coin type rechargeable lithium battery A-1 of Example 1, shown in FIG. 1, was assembled. FIG. 1 is a schematic sectional view, showing a rechargeable lithium battery construction of Example 1 as such assembled. As shown in FIG. 1, the positive electrode 1 and negative electrode 7 are disposed on opposite sides of a separator 8 comprised of a microporous polypropylene membrane. The positive electrode 1, negative electrode 7 and separator 8 are accommodated in a battery case defined by a positive can 3 and a negative can 5. The positive electrode 1 is electrically coupled to the positive can 3 by a positive current collector 2. The negative electrode 7 is electrically coupled to the negative can 5 by a negative current collector 6. An insulating polypropylene gasket 4 physically separates the respective peripheries of the positive can 3 and the negative can 5 to prevent short-circuiting thereof. Such arrangements lead to the secondary battery construction which has the ability to be charged and recharged.

In order to investigate how the type of metallic element M affects the charge-discharge cycle life of a resulting battery, other rechargeable lithium batteries A-2 through A-6 of Example 1 were assembled by following the above-described procedures, with the exception that Cu, as one starting material used in the procedure (A), was changed to Zn, Cr, Mn, Co or Ni.

COMPARATIVE EXAMPLE 1

The procedure of Example 1 was followed, except that $TiS_2$ was used as the positive active material, to assemble a coin type battery B-1 of Comparative Example 1.

Another coin type battery B-2 of Comparative Example 1 was further assembled by following the procedure of Example 1, with the exception that a mixture (active material disclosed in Japanese Patent Laid Open No. Sho 60-175371) containing 5 parts by weight of copper powder with an average particle size of 5 $\mu$m, based on 100 parts by weight of TiS$_2$, was used as the positive active material.

(F) Charge-Discharge Cycle Life Characteristics

Each battery was charged at a current of 100 $\mu$A at 25° C. to 2.6 V and then discharged at a current of 100 $\mu$A to 1.5 V. This unit cycle was repeated and a capacity retention (%) was determined by a ratio of a 50th-cycle discharge capacity to a 1st-cycle discharge capacity. The results are given in Table 1.

For the batteries A-1 through A-6 of Example 1, a discharge voltage was about 1.8 V, on average, and an initial capacity was 2.4–2.6 mAh. For the batteries B-1 and B-2 of Comparative Example 1, a discharge voltage was 1.8 V and an initial capacity was 2.0–2.2 mAh.

TABLE 1

| Designation of Battery | Positive Active Material | Negative Active Material | Capacity Retention (%) |
| --- | --- | --- | --- |
| A-1 | $Cu_{0.1}Ti_{0.9}S_2$ | Graphite | 90 |
| A-2 | $Zn_{0.1}Ti_{0.9}S_2$ | Graphite | 92 |
| A-3 | $Cr_{0.1}Ti_{0.9}S_2$ | Graphite | 91 |
| A-4 | $Mn_{0.1}Ti_{0.9}S_2$ | Graphite | 93 |
| A-5 | $Co_{0.1}Ti_{0.9}S_2$ | Graphite | 89 |
| A-6 | $Ni_{0.1}Ti_{0.9}S_2$ | Graphite | 90 |
| B-1 | $TiS_2$ | Graphite | 56 |
| B-2 | $TiS_2$ + Cu | Graphite | 59 |

As apparent from Table 1, the batteries A-1 through A-6 in accordance with the present invention exhibit the increased capacity retention values, compared to the batteries B-1 and B-2 of Comparative Example. This demonstrates their superior charge-discharge cycle life characteristics.

EXAMPLE 2

Coin type batteries A-7 and A-8 of Example 2 were assembled utilizing $Cu_{0.1}Ti_{0.9}S_2$ for their positive active material and metallic Li and Li—Al alloy (20.6 parts by weight of Li and 79.4 parts by weight of Al) for their respective negative active materials. Each battery was measured for charge-discharge cycle life.

The procedures (A), (D) and (E) as employed in Example 1 were followed to prepare the positive electrode and electrolyte solution and to assemble batteries. The procedure (B) used in Example 1 for insertion of lithium into the positive electrode was not carried out in Example 2. The negative electrode was prepared according to the following procedure.

(C') Negative Electrode Preparation

A sheet composed of metallic Li or Li—Al alloy was punched under argon atmosphere to remove therefrom a disc-form negative electrode having a diameter of 10 mm and a thickness of 1.0 mm. These negative electrodes were used in the assembly of batteries.

COMPARATIVE EXAMPLE 2

The procedure of Example 2 was followed, except that the mixture (active material disclosed in Japanese Patent Laid Open No. Sho 60-175371) containing 5 parts by weight of copper powder with an average particle size of 5 $\mu$m, based on 100 parts by weight of TiS$_2$, was used as the positive active material, to assemble coin type batteries B-3 and B-4 of Comparative Example 2.

(F') Charge-Discharge Cycle Life Characteristics

Each battery was discharged at a current of 100 $\mu$A at 25° C. to 1.5 V. Subsequently, the battery was charged at a current of 100 $\mu$A to 2.8 V and then discharged at a current of 100 $\mu$A to 1.5 V, which was recorded as a 1st cycle.

Thereafter, a unit cycle consisted of the charging at a current of 100 $\mu$A to 2.8 V and the subsequent discharging at a current of 100 $\mu$A to 1.5 V. This unit cycle was repeated and a capacity retention (%) was determined by a ratio of a 50th-cycle discharge capacity to the 1st-cycle discharge capacity. The results are given in Table 2.

An average discharge voltage was 1.8 V for the battery A-7 and 1.4 V for the battery A-8. An initial capacity was 2.4 mAh for both batteries A-7 and A-8. For both of the comparative batteries B-3 and B-4, an average discharge voltage was 1.8 V and an initial capacity was 2.0–2.2 mAh.

TABLE 2

| Designation of Battery | Positive Active Material | Negative Active Material | Capacity Retention (%) |
| --- | --- | --- | --- |
| A-7 | $Cu_{0.1}Ti_{0.9}S_2$ | Metallic Li | 71 |
| A-8 | $Cu_{0.1}Ti_{0.9}S_2$ | Li—Al Alloy | 72 |
| B-3 | $TiS_2$ + Cu | Metallic Li | 54 |
| B-4 | $TiS_2$ + Cu | Li—Al Alloy | 57 |

As apparent from the results shown in Table 2, the batteries A-7 and A-8 in accordance with the present invention exhibit the increased capacity retention values, compared to the comparative batteries B-3 and B-4. This demonstrates their superior charge-discharge cycle life characteristics.

As can be appreciated from the comparison with the results shown in Table 1, the batteries A-1 through A-6 utilizing the graphite negative active material exhibit the increased capacity retention values, compared to the batteries A-7 and A-8. This is probably because the carbon material, when used as the negative active material, is contrary in property to metallic Li and Li alloys which, during charge and discharge, are accompanied by the growth of needlelike dendrites that could cause internal short circuits, and because the reaction of sulfur slightly dissolved in the electrolyte solution with metallic Li or Li in the Li alloys at the negative electrode can be avoided, which otherwise results in the deposition on the negative electrode surface of a compound, such as $Li_2S$, that could deactivate the negative electrode.

EXAMPLE 3

Coin type batteries A-9, A-10 and A-11 of Example 3 were assembled utilizing $Cu_{0.1}Ti_{0.9}S_2$ for their negative active material and lithium-containing transition metal compounds, i.e., $LiCoO_2$, $LiNiO_2$ and $LiMn_2O_4$ (See, for example, T. Ohzuku and A. Ueda, Solid State Ionics, 69, (1994), p.201) for their respective positive active materials. Each battery was measured for charge-discharge cycle life.

The procedure (A) used in Example 1 for preparation of the positive electrode was followed, except that the current collector material was changed from Al to Cu, to obtain a negative electrode incorporating $Cu_{0.1}Ti_{0.9}S_2$ as the negative active material. The procedures (D) and (E) used in Example 1 were followed to prepare the electrolyte solution and to assemble batteries. The procedure (B) used in Example 1 for insertion of lithium into the positive electrode (negative electrode in this case) was not carried out in Example 3. A positive electrode was prepared according to the following procedure.

(A') Positive Electrode Preparation $Li_2CO_3$ and $CoCO_3$, as starting materials, were weighed such that a ratio of numbers of Li and Co atoms was brought to 1:1, and then mixed in a mortar. The mixture was pressed in a 17 mm-diameter mold at a pressure of 115 kg/cm$^2$ into a shape, and then calcined in the air at 800° C. for 24 hours to obtain a calcined product of $LiCoO_2$. This calcined product was crushed in a mortar to particles with an average particle size of 10 μm for use as positive active material.

85 parts by weight of the $LiCoO_2$ powder, 10 parts by weight of carbon powder as an electrical conductor, and 5 parts by weight of polyvinylidenefluoride powder as a binder were mixed. By adding this mixture to an N-methyl-2-pyrrolidone (NMP) solution, a slurry was formed. The slurry was coated by a doctor blade technique onto one surface of a 20 μm thick aluminum current collector to form an active material layer thereon. The current collector carrying the active material layer thereon was dried at 150° C. and then punched to remove therefrom a disc-form positive electrode having a diameter of 10 mm and a thickness of about 80 μm.

Similarly, $LiNO_3$ and $NiO$, as starting materials, were weighed such that a ratio of numbers of Li and Ni atoms was brought to 1:1, and then mixed in a mortar. The mixture was calcined under oxygen atmosphere at 700° C. for 48 hours to obtain a calcined product of $LiNiO_2$. This calcined product was crushed in a mortar to particles with an average particle size of 10 μm for use as the positive active material. Thereafter, a slurry was formed and processed in the same manner as described above to prepare a positive electrode which contained $LiNiO_2$ as the active material.

Also similarly, $LiOH.H_2O$ and $MnO_2$, as starting materials, were weighed such that a ratio of numbers of Li and Mn atoms was brought to 1:2, and then mixed in a mortar. The mixture was calcined in the air at 650° C. for 48 hours to obtain a calcined product of $LiMn_2O_4$. This calcined product was crushed in a mortar to particles with an average particle size of 10 μm for use as the positive active material. Thereafter, a slurry was formed and processed in the same manner as described above to prepare a positive electrode which contained $LiMn_2O_4$ as the active material.

(F''') Charge-Discharge Cycle Life Characteristics

Each battery was charged at a current of 100 μA at 25° C. to 2.8 V and then discharged at a current of 100 μA to 0.5 V. This was recorded as a 1st cycle. Thereafter, a unit cycle consisted of the charging at a current of 100 μA to 2.0 V and the subsequent discharging at a current of 100 μA to 0.5 V. This unit cycle was repeated and a capacity retention (%) was determined by a ratio of a 50th-cycle discharge capacity to the 1st-cycle discharge capacity. The results are given in Table 3.

For the batteries A-9, A-10 and A-11, a discharge voltage was 1.2–1.4 V, on average, and an initial capacity was 2.4 mAh.

TABLE 3

| Designation of Battery | Positive Active Material | Negative Active Material | Capacity Retention (%) |
|---|---|---|---|
| A-9 | $LiCoO_2$ | $Cu_{0.1}Ti_{0.9}S_2$ | 94 |
| A-10 | $LiNiO_2$ | $Cu_{0.1}Ti_{0.9}S_2$ | 96 |
| A-11 | $LiMn_2O_4$ | $Cu_{0.1}Ti_{0.9}S_2$ | 90 |

As apparent from Table 3, the batteries, when utilizing the titanium complex sulfide of the present invention for their negative active material and Li-containing transition metal complex oxides for their respective positive electrode materials, exhibit capacity retention values of 90–96% to demonstrate their superior charge-discharge cycle life characteristics.

EXAMPLE 4 AND COMPARATIVE EXAMPLE 3

Coin type batteries were assembled utilizing the complex sulfide of the present invention, $Cu_xTi_{1-x}S_2$, for the positive active material and natural graphite for the negative active material, wherein the stoichiometry x of the introduced metallic element Cu was varied to investigate its effect on charge-discharge cycle lives of resulting batteries. The procedure of Example 1 was followed, except that the ratio of numbers of Cu and Ti atoms was varied, to prepare $Cu_{0.01}Ti_{0.99}S_2$, $Cu_{0.02}Ti_{0.98}S_2$, $Cu_{0.04}Ti_{0.96}S_2$, $Cu_{0.08}Ti_{0.92}S_2$, $Cu_{0.12}Ti_{0.88}S_2$ $Cu_{0.17}Ti_{0.83}S_2$ and $Cu_{0.18}Ti_{0.82}S_2$ for use as active materials. Coin type batteries A-12 through A-18 of Example 4 were assembled utilizing these substances for their respective positive active materials and natural graphite for their negative active material. Also, $Cu_{0.19}Ti_{0.81}S_2$ and $Cu_{0.2}Ti_{0.8}S_2$ were prepared by further varying the ratio of number of Cu and Ti atoms, and coin type batteries B-5 and B-6 of Comparative Example 3 were assembled utilizing those substances as their respective positive active materials.

These batteries were measured for capacity retention in the same manner as in Example 1. The results are given in FIG. 2. Each battery exhibited an average discharge voltage of 1.8 V and an initial capacity of 2.2–2.6 mAh.

Figure 2:
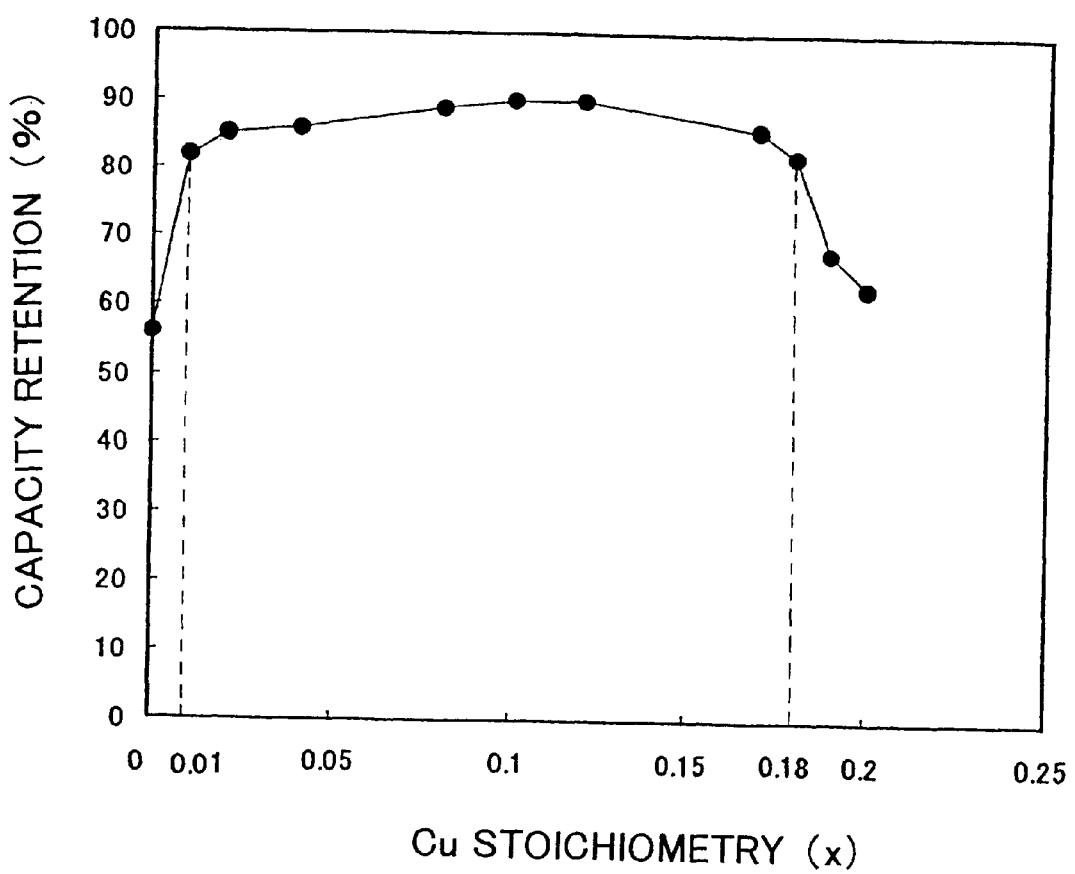
FIG. 2 is a graph showing the relationship between the Cu stoichiometry x in the composition $Cu_xTi_{1-x}S_2$ and the capacity retention of the battery utilizing the $Cu_xTi_{1-x}S_2$ active material.

As can be seen from the graph shown in FIG. 2, the batteries exhibit high capacity retention values when the Cu stoichiometry x does not exceed 0.18. It is believed that, when the Cu stoichiometry x is maintained not to exceed 0.18, the metallic element Cu is held in the crystal lattice, without the undesirable deposition of a simple substance or sulfide phase of Cu, to result in better stabilizing the crystal structure.

Particularly for $0.01 \leq x \leq 0.18$, the batteries exhibit the capacity retention within the range of 82–90% to demonstrate their superior cycle life performances.

EXAMPLE 5 AND COMPARATIVE EXAMPLE 4

Coin type batteries were assembled utilizing the complex sulfide of the present invention, $Cu_{0.1}Ti_{0.9}S_y$, for their positive active material and natural graphite for their negative active material, wherein the S stoichiometry y was varied to investigate its effect on charge-discharge cycle lives of resulting batteries. The procedure of Example 1 was followed, except that the proportion of S atoms introduced was varied, to prepare $Cu_{0.1}Ti_{0.9}S_{1.65}$, $Cu_{0.1}Ti_{0.9}S_{1.7}$, $Cu_{0.1}Ti_{0.9}S_{1.8}$, $Cu_{0.1}Ti_{0.9}S_{2.2}$ and $Cu_{0.1}Ti_{0.9}S_{2.25}$ for use as active materials. Coin type batteries A-19 through A-23 of Example 5 were assembled utilizing these substances for their respective positive active materials and natural graphite for their negative active material. Also, $Cu_{0.1}Ti_{0.9}S_{1.5}$, $Cu_{0.1}Ti_{0.9}S_{1.6}$, $Cu_{0.1}Ti_{0.9}S_{2.3}$ and $Cu_{0.1}Ti_{0.9}S_{2.4}$ were prepared, and coin type batteries B-7 through B-10 of Comparative Example 4 were assembled utilizing those substances as their respective positive active materials.

These batteries were measured for capacity retention in the same manner as in Example 1. The results are given in FIG. 3. Each battery exhibited an average discharge voltage of 1.8 V and an initial capacity of 2.2–2.7 mAh.

Figure 3:
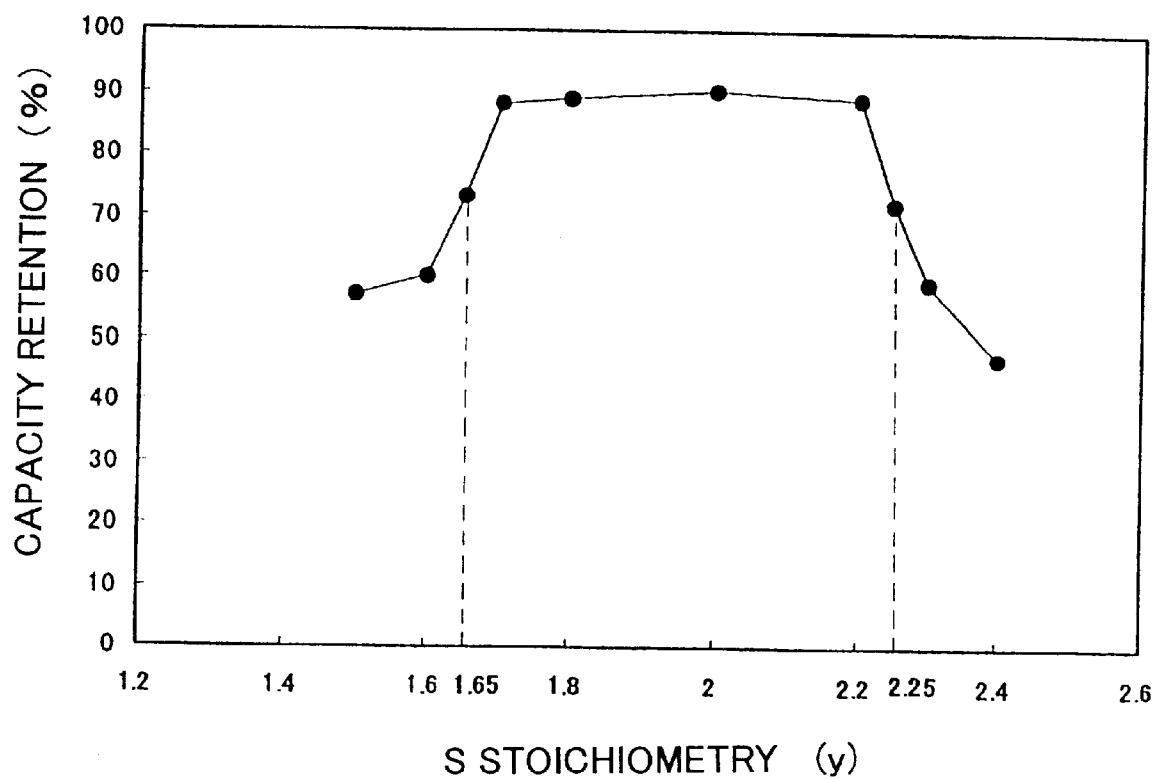
FIG. 3 is a graph showing the relationship between the S stoichiometry y in the composition $Cu_{0.1}Ti_{0.9}S_y$ and the capacity retention of the battery utilizing the $Cu_{0.1}Ti_{0.9}S_y$ active material.

As can be seen from the graph shown in FIG. 3, when the S stoichiometry y is maintained within the range $1.65 \leq y \leq 2.25$, the batteries exhibit high capacity retention values to demonstrate their superior cycle life characteristics. Particularly when the S stoichiometry y is maintained within the range $1.7 \leq y \leq 2.2$, the batteries exhibit good capacity retention values of 87–90%.

It is believed that, when the S stoichiometry y is maintained within the range $1.65 \leq y \leq 2.25$, the $TiS_2$ phase which functions as active material to electrochemically react with Li ions is allowed to exist in a stable state, as indicated in a Ti—S binary phase diagram, and the metallic element Cu is held in the crystal lattice of the $TiS_2$ phase, without the occurrence of deposition of Ti, S or Cu simple substance, to result in highly stabilizing the crystal structure.

The rechargeable lithium battery of the present invention utilizes the complex sulfide represented by the formula $M_xTi_{1-x}S_y$, either with or without addition of Li thereto, for active material of a positive or negative electrode. The use of such a complex sulfide active material leads to the construction of rechargeable lithium batteries capable of excellent charge-discharge cycle life performance characteristics. The reliability of equipment, if driven by such rechargeable lithium batteries, can thus be increased.

The electrode active material of the present invention, when used for rechargeable lithium batteries, can impart the improved discharge capacity and excellent charge-discharge cycle life characteristics thereto.

What is claimed is:

1. A rechargeable lithium battery having a positive electrode, a negative electrode and a non-aqueous electrolyte; said positive electrode containing, as its active material, a complex sulfide represented by the compositional formula $M_xTi_{1-x}S_y$, either with or without addition of Li thereto, wherein M is at least one selected from Cu, Zn, Cr, Mn, Co and Ni, x satisfies the relationship $0<x \leq 0.18$ and y satisfies the relationship $1.65 \leq y \leq 2.25$.

2. The rechargeable lithium battery of claim 1, wherein said x satisfies the relationship $0.01 \leq x \leq 0.18$.

3. The rechargeable lithium battery of claim 1, wherein said negative electrode contains, as its active material, lithium-free or lithium-containing carbon material.

4. A rechargeable lithium battery having a positive electrode, a negative electrode and a non-aqueous electrolyte; said negative electrode containing, as its active material, a complex sulfide represented by the compositional formula $M_xTi_{1-x}S_y$, either with or without addition of Li thereto, wherein M is at least one selected from Cu, Zn, Cr, Mn, Co and Ni, x satisfies the relationship $0<x \leq 0.18$ and y satisfies the relationship $1.65 \leq y \leq 2.25$.

5. The rechargeable lithium battery of claim 4, wherein said x satisfies the relationship $0.01 \leq x \leq 0.18$.

6. The rechargeable lithium battery of claim 5, wherein said positive electrode contains, as its active material, an Li-containing transition metal oxide.

7. An electrode active material, for use in rechargeable lithium batteries, comprising a complex sulfide represented by the compositional formula $M_xTi_{1-x}S_y$, either with or without addition of Li thereto, wherein M is at least one selected from Cu, Zn, Cr, Mn, Co and Ni, x satisfies the relationship $0<x \leq 0.18$ and y satisfies the relationship $1.65 \leq y \leq 2.25$.

8. A positive active material comprising the electrode active material of claim 7.

9. A negative active material comprising the electrode active material of claim 7.

* * * * *

UNITED STATES PATENT AND TRADEMARK OFFICE
CERTIFICATE OF CORRECTION

PATENT NO.    : 6,376,127 B1
DATED         : April 23, 2002
INVENTOR(S)   : Teranishi et al.

It is certified that error appears in the above-identified patent and that said Letters Patent is hereby corrected as shown below:

Column 2,
Line 31, after "$(C_4F_9SO_2)$" please insert -- , $LiC(CF_3SO_2)_3$, --

Signed and Sealed this

Fifteenth Day of October, 2002

Attest:

Attesting Officer

JAMES E. ROGAN
Director of the United States Patent and Trademark Office